Patented Apr. 13, 1954

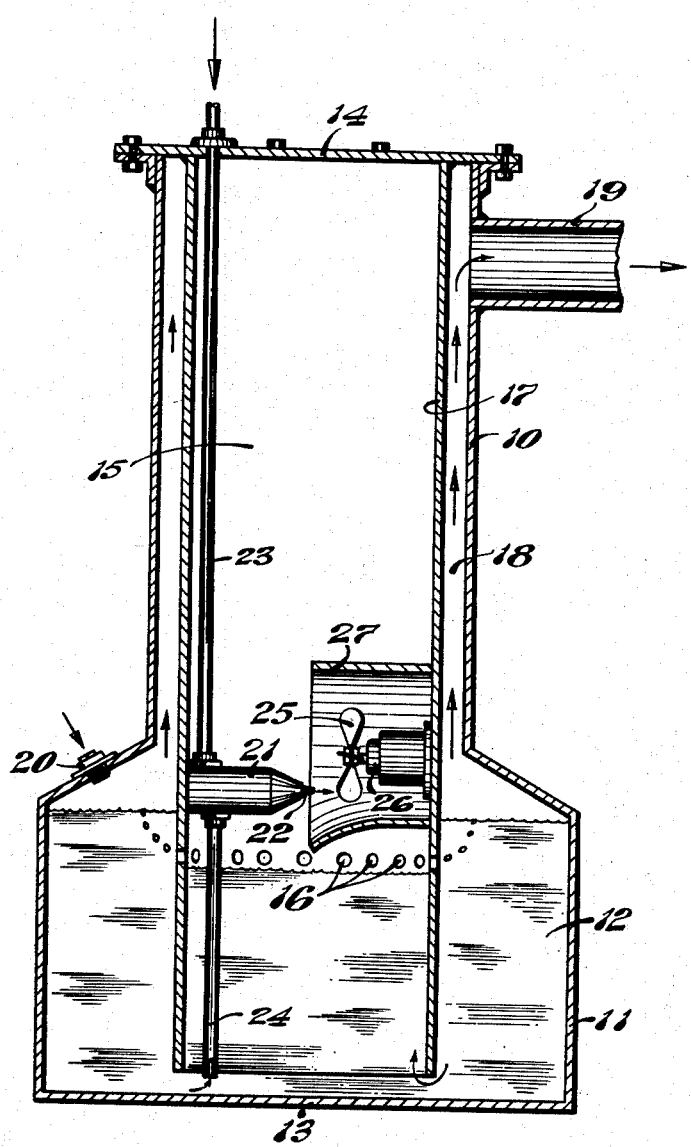

2,675,214

UNITED STATES PATENT OFFICE 2,675,214

APPARATUS FOR PRODUCING AEROSOLS

Charles B. Wendell, Jr., Needham, Mass., assignor to Godfrey L. Cabot, Inc., Boston, Mass., a corporation of Massachusetts Application September 29, 1950, Serial No. 187,551

2 Claims. (Cl. 261—21)

This invention relates to the production of aerosols and comprises a novel apparatus in which an improved process may be carried out for producing a stable aerosol of high liquid content.

Aerosols are those colloids which consist of liquid dispersoids in gaseous dispersing medium. The size of the liquid particles is generally less than 10 microns in diameter and more usually varies between .001 and 1 micron, the stability of the dispersion decreasing with increasing particle size. Because of the extremely small size of the particles the properties of aerosols are somewhat unique. The exposed surface per unit volume of liquid is enormous; 1 cubic centimeter of liquid in spherical particles .001 micron in diameter has an exposed surface of 6000 square meters. In addition to the amount of exposed surface, the activity of the surface is also greater because of its sharp curvature. Consequently, an aerosol is an ideal state for treating liquids in reactions which occur on the surface. The production of an aerosol also affords a means for preparing a normally liquid material in a gaseous state in concentrations far greater than can be realized by vaporizing the liquid. This is especially useful when it is desired to constitute a liquid of low vapor pressure in the gaseous state at low temperatures. Another advantage of an aerosol is that, while the nominal phase is gaseous, the dispersoids are liquid and retain many of the physical properties of the liquid, as, for instance, specific heat, heat of crystallization and heat of vaporization.

The unusual properties of aerosols have been utilized commercially in many ways. Fruit trees are often protected from freezing by surrounding them with an aerosol of water in air, thereby taking advantage of the high enthalpy of the water. Aerosols of water in air or carbon dioxide are used to fight fires, especially oil fires, an application taking advantage of the high heat of vaporization of the water. Other uses include the dispersing of insecticides as aerosols of a solution of the insecticide, the formation of combustible mixtures of heavy, low vapor pressure hydrocarbons and air, and countless applications where liquids and gases must be reacted together.

The common methods of preparing aerosols are either to disperse the liquid in a stream of the gas, as is done with an atomizer, or to condense vapors of the liquid in the presence of the gas, as is commonly experienced at the spout of a teakettle. The condensation method is the most common and has been considered the most satisfactory because by it the liquid is most easily formed into particles sufficiently small to constitute a stable dispersion, but it is a rather expensive process which requires vaporization and condensation of the liquid. Dispersion techniques have heretofore been generally unsatisfactory in producing stable aerosols because the great bulk of liquid is seldom reduced to particles which are small enough to remain stably dispersed in the gas. If the liquid is extremely volatile the large particles may diminish in size due to evaporation from their surfaces and become small enough to be stable, but this effect cannot be hoped for when the liquid is but slightly volatile. The primary object of this invention is the production, by a dispersion technique, of stable aerosols of high liquid content.

By the improved process of this invention the economies inherent in the dispersion method of producing aerosols are realized. Another advantage is that stable aerosols can be prepared of liquids which are thermally unstable and which therefore cannot be incorporated into aerosols by the condensation method.

I have discovered that a stable, high liquid content aerosol can be obtained by dispersing the liquid in the gas by any of the ordinary processes known to the art, as, for instance, with an atomizer, then causing the resulting mixture to impinge at high velocity against a solid surface, and, finally, bubbling the mixture through a mass of the liquid of which the particles are formed. When the liquid is first dispersed in the gas the dispersion formed abounds in oversize particles which, if left to stand, would readily settle out. By impinging this dispersion against a solid surface the oversize particles are partially removed by collecting on the surface, but mostly they are broken up and redispersed as finer particles. Classification is further effected when the dispersion is caused to bubble through the liquid whereby the larger and less stably dispersed particles combine with the mass of liquid. Preferably I carry out my process in a chamber which exits below the surface of a reservoir of the liquid. The impinging surface may be the wall of the chamber, but it is advantageous if this surface be rapidly rotating in order that liquid which has collected on it be thrown off and partially redispersed. A fan, mounted to rotate freely, provides a convenient method of obtaining a rapidly rotating surface, rotation being imparted by the force of the impinging stream.

This invention will best be understood and appreciated from the following detailed description of a preferred embodiment of apparatus suitable for carrying out my new and improved process, selected for purposes of illustration and shown in the accompanying drawing, in which:

The figure is a view in longitudinal section.

The illustrated apparatus consists of an enclosing casing 10, conveniently of circular cross-section and cylindrical and merging at its lower end into the bottom section 11 of larger cross-section which provides a reservoir 12. A plate 13 closes the bottom of the casing and the top is closed by a cover 14. An internal chamber 15 is formed by cylindrical wall 17 which is suspended from the underside of the cover 14 and arranged concentrically within the enclosing casing 10. The bottom of the chamber 15 is open and communicates with the reservoir 12. A number of holes 16, spaced circumferentially at a level below the top of the reservoir 12, perforate the chamber wall 17 providing an outlet from the chamber 15 to the reservoir 12. Between the chamber wall 17 and the enclosing casing 10 is an annular space 18. Near the top and attached to the enclosing casing 10 is an exit duct 19 which communicates with the annular space 18. A filling inlet is provided in the enclosing casing 10 near the top of the bottom section 11 by the cap 20 which may be threaded to fit a tapped hole.

Inside of the chamber 15, and about level with the top of the reservoir 12, is an atomizer 21 of conventional design and having a converging nozzle 22. A gas tube 23 enters the chamber 15 through the cover 14 and connects with the atomizer. An inlet tube 24 leads from the bottom of the reservoir into the atomizer 21. Opposite the nozzle 22 of the atomizer is a fan 25 having two or more blades of a pitch preferably between 5 and 50 degrees from the plane of rotation. The fan is mounted to rotate freely and is supported in bearings 26. The axis of the fan 25 is disposed parallel to and somewhat above the axis of the nozzle 22, and the blades are located just beyond the point of convergence of the nozzle. Surrounding the fan is a circular cylindrical baffle 27 having a downwardly distending drainage lip at the bottom.

The materials of which this apparatus are constructed are not critical but may be the ordinary materials of construction which would be selected as suitable for the chemical and physical properties of the liquid and gas to be treated.

In carrying out the process as herein illustrated, the reservoir 12 is first filled with the oil or other liquid which is to constitute the disperse phase of the aerosol. The liquid is maintained in the reservoir 12 at a level above the holes 16. The gas which is to constitute the dispersing medium is forced through the tube 23 under sufficient pressure to impart to the stream which issues from the nozzle 22 a high velocity. The velocity of the gas in the atomizer 21 reduces the pressure therein and the liquid rises in the inlet tube 24, meets the stream of gas and is dispersed in it. The stream of liquid-gas mixture issuing from the nozzle 22 impinges against the fan 25 causing it to rotate. The larger particles of liquid in the liquid-gas mixture on striking the fan blade are partially separated out, collecting on the blades, and partially broken up into smaller particles which return to the mixture. The rotating fan blades provide a means of redispersing liquid which has been separated. Centrifugal force throws this liquid off the blades as particles of random size travelling at a high velocity. The larger particles on striking the baffle 27 undergo a second classification and redispersion, the collected liquid being returned to the liquid in the lower portion of the chamber 15. At the start of the process the pressure builds up in chamber 15 until it is sufficient to force the level of the liquid below the holes 16. Thereafter the dispersion escapes through these holes and enters the body of liquid in the reservoir 12 through which it bubbles. Oversize particles which remain in the dispersion are removed while the dispersion bubbles through the liquid, but those particles which are small enough to be stably dispersed are not affected. After leaving the reservoir 12 the aerosol enters the annular space 18 and passes out through the exit duct 19.

The process of my invention is not limited to the preferred apparatus described above, but may be carried out in any apparatus which will perform the functions of first atomizing the liquid in the gas, then impinging the mixture against a solid surface for classification and redispersion, and, finally, washing the dispersion in the liquid which constitutes the dispersoids. I prefer to use the fan blades as the solid surface against which the liquid-gas mixture is caused to impinge because of the redispersion and shearing effect which is thereby effected, but it will be understood that these effects can be sacrificed when conditions warrant it, as, for instance, when the liquid has little or no tendency to wet the solid surface and therefore no tendency to cling to it. A stationary surface is then quite effective, or the fan may be driven if desired from an external source of power.

The process of my invention is well adapted to disperse any liquid that is sufficiently fluid to be dispersed, but it is best adapted to disperse rather viscous liquids of low vapor pressure, such as heavy paraffin hydrocarbons, glycerine and the like. Thermal instability of a liquid is not an obstacle to the preparation of stable high concentration dispersions of it.

By means of the apparatus and process of this invention stable aerosols containing in excess of 1 per cent based on the total weight of the aerosol can easily be produced. It has been determined by the technique of Sinclair and La Mer, described in "Light Scattering as a Measure of Particle Size in Aerosols" (1949), 44 Chem. Rev., 245, that over 90% of the particles are less than one micron in diameter and, by collection of the larger particles on glass slides, that none of the particles are larger than ten microns in diameter.

It will be seen that this invention in one aspect comprises a novel means of dispersing the liquid in the gas by impinging the dispersion against a solid surface whereby the amount of liquid present in aerosol-size particles is increased and the amount of liquid present in oversize particles is correspondingly reduced. In another aspect it comprises a means for classifying the dispersed particles so that the oversize particles are removed by bubbling the aerosol through the liquid of which the particles are constituted.

Having disclosed my invention, and described in detail a preferred manner of carrying out my novel process, I claim as new and desire to secure by Letters Patent:

1. Apparatus for producing aerosols comprising an outer chamber adapted to contain a body of liquid in its lower section, an inner chamber therein opening only beneath normal liquid level in said outer chamber, an atomizer in the inner chamber having a discharge nozzle directed diametrically therein, means for supplying a gas under pressure and liquid from the body of liquid in the chambers to said atomizer, a fan mounted in the inner chamber diametrically opposite the atomizer and having its axis offset from that of the atomizer nozzle but with its blades in the path of the atomizer spray, a baffle surrounding the fan, the side wall of the inner chamber having a plurality of orifices located below the normal liquid level in the outer chamber, and means to supply liquid to and to conduct aerosol from the outer chamber.

2. Apparatus for producing aerosols comprising an outer chamber adapted to contain a body of liquid in its lower section, an inner chamber therein opening only beneath normal liquid level in said outer chamber, an atomizer in the inner chamber having a discharge nozzle therein, means for supplying a gas under pressure and liquid to said atomizer, a fan mounted in the inner chamber opposite the atomizer and having its axis offset from that of the atomizer nozzle but with its blades in the path of the atomizer spray, a baffle surrounding the fan, the side wall of the inner chamber having a plurality of orifices located below the normal liquid level in the outer chamber, and means to supply liquid to and to conduct aerosol from the outer chamber.

References Cited in the file of this patent

UNITED STATES PATENTS

| Number | Name | Date |
|---|---|---|
| 736,157 | Sams | Aug. 11, 1903 |
| 893,354 | McGregor | July 14, 1908 |
| 2,437,526 | Heidbrink et al. | Mar. 9, 1948 |
| 2,438,868 | Trier | Mar. 30, 1948 |
| 2,605,087 | Dautrebande | July 29, 1952 |
| 2,605,088 | Dautrebande | July 29, 1952 |